(12) United States Patent
Fang et al.

(10) Patent No.: US 11,899,945 B2
(45) Date of Patent: Feb. 13, 2024

(54) METHOD AND APPARATUS FOR PERFORMING COMMUNICATIONS SPECIFICATION VERSION CONTROL OF MEMORY DEVICE IN PREDETERMINED COMMUNICATIONS ARCHITECTURE WITH AID OF COMPATIBILITY MANAGEMENT, AND ASSOCIATED COMPUTER-READABLE MEDIUM

(71) Applicant: Silicon Motion, Inc., Hsinchu County (TW)

(72) Inventors: Hong-Ren Fang, Hsinchu County (TW); Chun-Che Yang, Taoyuan (TW); Cheng-Yu Lee, Hsinchu County (TW); Te-Kai Wang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 108 days.

(21) Appl. No.: 17/705,413

(22) Filed: Mar. 28, 2022

(65) Prior Publication Data

US 2023/0105153 A1 Apr. 6, 2023

Related U.S. Application Data

(60) Provisional application No. 63/251,680, filed on Oct. 3, 2021.

(51) Int. Cl.
*G06F 3/06* (2006.01)
(52) U.S. Cl.
CPC .......... *G06F 3/0629* (2013.01); *G06F 3/0604* (2013.01); *G06F 3/0679* (2013.01)

(58) Field of Classification Search
CPC ..... G06F 3/0629; G06F 3/0604; G06F 3/0679
See application file for complete search history.

(56) References Cited

U.S. PATENT DOCUMENTS 10,095,614 B2 * 10/2018 Chyan .................. G06F 13/385
2004/0230716 A1 * 11/2004 Imai ...................... G06F 3/1279
710/15

(Continued)

FOREIGN PATENT DOCUMENTS

CN 106990977 A 7/2017
TW I592800 B 7/2017

*Primary Examiner* — Ryan Bertram
(74) *Attorney, Agent, or Firm* — Winston Hsu

(57) ABSTRACT

A method for performing communications specification version control of a memory device in predetermined communications architecture with aid of compatibility management, associated apparatus and computer-readable medium are provided. The method may include: utilizing a memory controller to receive a first command from a host device through a transmission interface circuit of the memory controller; utilizing the memory controller to execute a device-side compatibility management procedure of a compatibility management function to detect whether the host device conforms to any version of multiple predetermined versions of a predetermined communications specification according to the first command to generate a detection result, and selectively switch from one firmware version to another firmware version according to the detection result; and utilizing the memory controller to send a first response to the host device through the transmission interface circuit, wherein the first response is sent to the host device in response to the first command.

11 Claims, 5 Drawing Sheets

(56) References Cited

U.S. PATENT DOCUMENTS

| | | | |
|---|---|---|---|
| 2007/0180172 A1 | 8/2007 | Schmidt | |
| 2010/0017564 A1* | 1/2010 | Heo | G06F 3/061 |
| | | | 711/E12.001 |
| 2012/0042120 A1* | 2/2012 | Ni | G06F 21/78 |
| | | | 711/E12.008 |
| 2012/0311247 A1 | 12/2012 | Yeh | |
| 2013/0132648 A1* | 5/2013 | Choi | G06F 13/385 |
| | | | 711/103 |
| 2013/0138837 A1* | 5/2013 | Liu | G06F 3/0676 |
| | | | 710/11 |
| 2014/0331033 A1* | 11/2014 | Liang | G06F 12/00 |
| | | | 713/1 |
| 2015/0012671 A1* | 1/2015 | Park | G06F 13/00 |
| | | | 713/323 |
| 2016/0162431 A1* | 6/2016 | Shen | G06F 13/4072 |
| | | | 710/313 |
| 2023/0100119 A1* | 3/2023 | Park | G11C 16/30 |
| | | | 711/154 |
| 2023/0169028 A1* | 6/2023 | Chen | G06F 13/385 |
| | | | 710/315 |
| 2023/0176733 A1* | 6/2023 | Chen | G06F 3/0629 |
| | | | 711/117 |

\* cited by examiner

METHOD AND APPARATUS FOR PERFORMING COMMUNICATIONS SPECIFICATION VERSION CONTROL OF MEMORY DEVICE IN PREDETERMINED COMMUNICATIONS ARCHITECTURE WITH AID OF COMPATIBILITY MANAGEMENT, AND ASSOCIATED COMPUTER-READABLE MEDIUM

CROSS REFERENCE TO RELATED APPLICATIONS

This application claims the benefit of U.S. Provisional Application No. 63/251,680, filed on Oct. 3, 2021. The content of the application is incorporated herein by reference.

BACKGROUND OF THE INVENTION

1. Field of the Invention

The present invention is related to memory control, and more particularly, to a method and apparatus for performing communications specification version control of a memory device in a predetermined communications architecture with aid of compatibility management, and an associated computer-readable medium.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. For example, multiple versions of the UFS specification, such as UFS 3.0 and UFS 3.1, may define their own features, respectively. When a manufacturer of the memory device tries to implement the memory device according to the UFS specification, some problems may occur. More particularly, in a preliminary phase (e.g., a design phase) before a mass production phase of the memory device, a controller integrated circuit (IC) vendor may originally provide a controller IC with a certain firmware version of a firmware code that conforms to a certain version of the UFS specification (e.g., UFS 3.0) to the manufacturer of the memory device. When determining that a target host device to be coupled to the memory device, as well as this memory device, should conform to another version of the UFS specification (e.g., UFS 3.1), the manufacturer of the memory device may need to wait for the controller IC vendor to solve the compatibility problem, since the controller IC with the current firmware version of the firmware code is not compatible with the target host device. For example, the controller IC vendor may need to prepare another controller IC for the manufacturer of the memory device or to replace the current firmware version of the firmware code with another firmware version of the firmware code and the manufacturer of the memory device may need to reconfigure the memory device, causing associated costs of both of the manufacturer of the memory device and the controller IC vendor to be increased. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing communications specification version control of a memory device in a predetermined communications architecture (e.g., a UFS communications architecture) with aid of compatibility management, and an associated computer-readable medium, in order to solve the above-mentioned problems.

At least one embodiment of the present invention provides a method for performing communications specification version control of a memory device in a predetermined communications architecture with aid of compatibility management, where the method can be applied to a memory controller of the memory device. The memory device may comprise the memory controller and a non-volatile (NV) memory, and the NV memory may comprise at least one NV memory element (e.g., one or more NV memory elements). The method may comprise: utilizing the memory controller to receive a first command from a host device through a transmission interface circuit of the memory controller; utilizing the memory controller to execute a device-side compatibility management procedure of a compatibility management function to detect whether the host device conforms to any version of multiple predetermined versions of a predetermined communications specification according to the first command to generate a detection result, and selectively switch from one firmware version to another firmware version according to the detection result; and utilizing the memory controller to send a first response to the host device through the transmission interface circuit, wherein the first response is sent to the host device in response to the first command.

In addition to the above method, the present invention also provides a memory controller of a memory device, where the memory device comprises the memory controller and a NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller, wherein the processing circuit is arranged to perform communications specification version control of the memory device in a predetermined communications architecture with aid of compatibility management. The memory controller further comprises a transmission interface circuit, and the transmission interface circuit is arranged to perform communications with the host device. For example, the memory controller receives a first command from the host device through the transmission interface circuit of the memory controller; the memory controller executes a device-side compatibility management procedure of a compatibility management function to detect whether the host device conforms to any version of multiple predetermined versions of a predetermined communications specification according to the first command to generate a detection result, and selectively switch from one firmware version to another firmware version according to the detection result; and the memory controller sends a first response to the host device through the transmission interface circuit, wherein the first response is sent to the host device in response to the first command.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

At least one embodiment of the present invention provides a method for performing communications specification version control of a memory device in a predetermined communications architecture with aid of compatibility management, where the method can be applied to a host device coupled to the memory device. The memory device may comprise a memory controller and a non-volatile (NV) memory, and the NV memory may comprise at least one NV memory element (e.g., one or more NV memory elements). The method may comprise: sending a first command from the host device to the memory controller through a transmission interface circuit of the host device, to trigger the memory controller to execute a device-side compatibility management procedure of a compatibility management function to detect whether the host device conforms to any version of multiple predetermined versions of a predetermined communications specification according to the first command to generate a detection result, and selectively switch from one firmware version to another firmware version according to the detection result; after sending the first command to trigger the memory controller to execute the device-side compatibility management procedure, waiting for a first response from the memory controller; and receiving the first response from the memory controller through the transmission interface circuit to get the first response, wherein the first response is sent by the memory controller to the host device in response to the first command.

In addition to the method mentioned above, the present invention also provides the host device that operates according to the method, and also provides a computer-readable medium storing a program code which causes the host device to operate according to the method when executed by the host device. According to some embodiments, the host device may send a vendor specific command (e.g., a vendor-defined command) to the memory device, for indicating that the host device conforms to a version of multiple predetermined versions of the UFS specification (e.g., one of UFS 3.0 and UFS 3.1).

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the host device. In some examples, the apparatus may comprise the electronic device.

According to some embodiments, the memory device may store data for the host device. In addition, the memory device may read the stored data in response to a host command from the host device, and provide the host device with the data read from the NV memory. In order to correct the related art problems, it is suggested that the memory device may operate according to a compatibility management working flow of the method to detect whether the host device conforms to any version of multiple predetermined versions of the UFS specification (e.g., UFS 3.0 and UFS 3.1) among all versions of the UFS specification, and to selectively switch from one firmware version to another firmware version according to a detection result of this detecting operation. According to some embodiments, the host device can be configured to send a vendor specific command (e.g., a vendor-defined command) to the memory device, for indicating that the host device conforms to the any version of the multiple predetermined versions of the UFS specification (e.g., one of UFS 3.0 and UFS 3.1), and the memory device can be configured to receive the vendor specific command (e.g., the vendor-defined command) from the host device and detect that the host device conforms to the any version of the multiple predetermined versions of the UFS specification (e.g., one of UFS 3.0 and UFS 3.1), and selectively switch from one firmware version to another firmware version according to the vendor specific command.

The present invention method and apparatus can guarantee that the memory device can operate properly in various situations. For example, the memory device can automatically perform firmware version switching according to the detection result of the detecting operation or according to the vendor specific command, and therefore can guarantee that the memory device is compatible with the host device. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
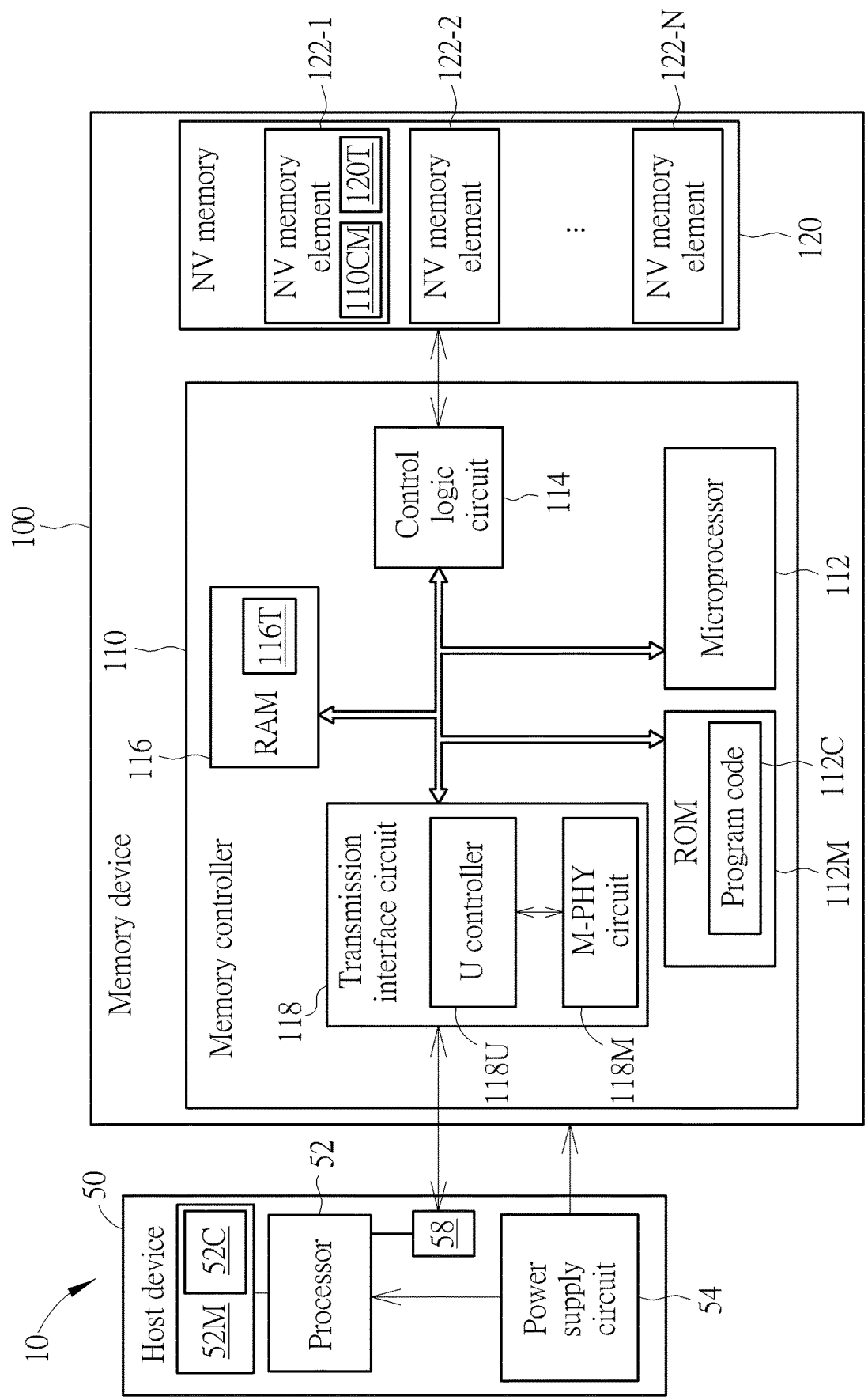
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a computer-readable medium 52M storing a program code 52C, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). In addition, the computer-readable medium 52M may be implemented by way of one or more hard disk drives (HDDs), one or more SSDs, etc. According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a physical layer (PHY) circuit such as a MIPI-PHY (M-PHY) circuit 118M, and at least one upper layer (U) controller (e.g., one or more upper layer controllers) which may be collectively referred to as the upper layer controller 118U (labeled "U controller" for brevity), and the transmission interface circuit 58 may be implemented to have a circuitry architecture (e.g., multiple corresponding sub-circuits) similar to or the same as that of the transmission interface circuit 118.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programming upon the memory units or data pages of specific physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses. The NV memory 120 may store a global L2P address mapping table 120T, for the memory controller 110 to control the memory device 100 to access data in the NV memory 120, but the present invention is not limited thereto. For example, the NV memory 120 may store multiple in-system programing (ISP) codes, for providing the memory device 100 (e.g., the memory controller 110) with various functions, respectively. The memory controller 110 may load any ISP code among the multiple ISP codes from the NV memory 120 into at least one storage region (e.g., a program code region in the RAM 116) within the memory controller 110, and the processing circuit such as the microprocessor 112 may run the any ISP code to make the memory device 100 (e.g., the memory controller 110) be equipped with a function corresponding to the any ISP code among the various functions mentioned above. For example, the any ISP code may represent a compatibility management ISP code 110CM which causes the memory device 100 (e.g., the memory controller 110) to have a compatibility management function when executed by the memory device 100 (e.g., the memory controller 110).

For better comprehension, the global L2P address mapping table 120T may be located in a predetermined region within the NV memory element 122-1, such as a system region, where one or more ISP codes among the multiple ISP codes, such as the compatibility management ISP code 110CM, may be located in another predetermined region within the NV memory element 122-1, but the present invention is not limited thereto. For example, the global L2P address mapping table 120T may be divided into a plurality of local L2P address mapping tables, and the local L2P address mapping tables, as well as the multiple ISP codes, may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N may comprise multiple blocks, and a block within the multiple blocks may comprise and record a specific number of pages, where the memory controller 110 may access a certain page of a certain block within the multiple blocks according to a block address and a page address.

Figure 2:
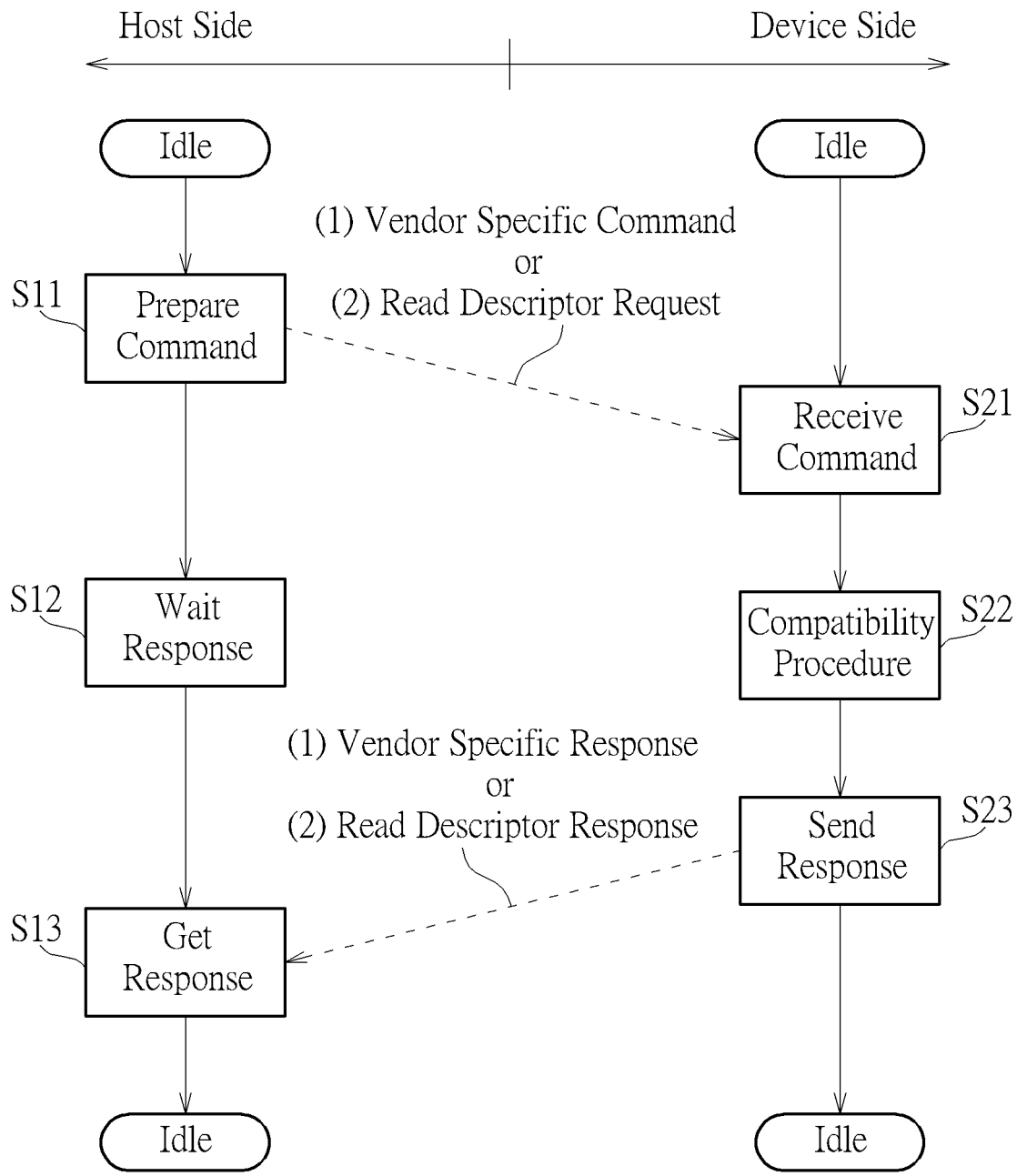
FIG. 2 illustrates a compatibility control scheme of a method for performing communications specification version control of a memory device such as that shown in FIG. 1 in a predetermined communications architecture with aid of compatibility management according to an embodiment of the present invention.

FIG. 2 illustrates a compatibility control scheme of a method for performing communications specification version control of a memory device such as that shown in FIG. 1 in a predetermined communications architecture (e.g., a UFS communications architecture) with aid of compatibility management (e.g., the compatibility management function) according to an embodiment of the present invention. The method can be applied to the architecture shown in FIG. 1, for example, the electronic device 10, the host device 50, the memory device 100, and the memory controller 110, and more particularly, the components within the memory controller 110. At the host side of the host device 50, the host device 50 (e.g., the processor 52 running the program code 52C) can be in an idle state, and then leave this idle state to perform the operations of Steps S11, S12 and S13, and enter the idle state thereof afterward. At the device side of the memory device 100, the memory device 100 (e.g., the memory controller 110, and more particularly, the microprocessor 112 running the compatibility management ISP code 110CM) can be in an idle state, and then leave this idle state to perform the operations of Steps S21, S22 and S23, and enter the idle state thereof afterward.

In Step S11, the host device 50 (e.g., the processor 52 running the program code 52C) may prepare a first command (labeled "Prepare Command" for brevity), and more particularly, send the first command to the memory device 100 (e.g., the memory controller 110) through the transmission interface circuit 58. For example, the first command may represent a vendor specific command (e.g., a vendor-defined command, which may be defined by a vendor of the memory controller 110), for indicating that the host device 50 conforms to a certain version of multiple predetermined versions of the UFS specification (e.g., one of UFS 3.0 and UFS 3.1) among all versions of the UFS specification, where the vendor specific command can be implemented by way of a write buffer command of the UFS specification, but the present invention is not limited thereto. For another example, the first command may represent a read descriptor request, where the memory device 100 (e.g., the memory controller 110) can detect whether the host device 50 conforms to any version of the multiple predetermined versions of the UFS specification (e.g., any of UFS 3.0 and UFS 3.1).

In Step S12, the host device 50 (e.g., the processor 52 running the program code 52C) may wait for a first response that is sent by the memory device 100 (e.g., the memory controller 110) in response to the first command (labeled "Wait Response" for brevity).

In Step S13, the host device 50 (e.g., the processor 52 running the program code 52C) may receive the first response from the memory device 100 (e.g., the memory controller 110) through the transmission interface circuit 58 to get the first response (labeled "Get Response" for brevity). For example, the first command may represent the vendor specific command (e.g., the vendor-defined command), and the first response may represent a vendor specific response (e.g., a vendor-defined response) corresponding to the vendor specific command (e.g., the vendor-defined command), for indicating a processing result of the compatibility management performed by the memory device 100 (e.g., the memory controller 110). For another example, the first command may represent the read descriptor request, and the first response may represent a read descriptor response corresponding to the read descriptor request.

In Step S21, the memory device 100 (e.g., the memory controller 110, and more particularly, the microprocessor 112 running the compatibility management ISP code 110CM) may receive the first command from the host device 50 through the transmission interface circuit 118 (labeled "Receive Command" for brevity).

In Step S22, the memory device 100 (e.g., the memory controller 110, and more particularly, the microprocessor 112 running the compatibility management ISP code 110CM) may execute a device-side compatibility management procedure (which may also be referred to as the compatibility procedure for brevity) of the compatibility management function. According to the first command, such as the vendor specific command or the read descriptor request, the memory device 100 (e.g., the memory controller 110, and more particularly, the microprocessor 112 running the compatibility management ISP code 110CM) may detect whether the host device 50 conforms to the any version of the multiple predetermined versions of the UFS specification (e.g., any of UFS 3.0 and UFS 3.1), and selectively switch from one firmware version to another firmware version according to a detection result of this detecting operation.

In Step S23, the memory device 100 (e.g., the memory controller 110, and more particularly, the microprocessor 112 running the compatibility management ISP code 110CM) may send the first response to the host device 50 through the transmission interface circuit 118 (labeled "Send Response" for brevity).

For better comprehension, the method may be illustrated with the respective working flows of the host device 50 and the memory device 100 as shown in FIG. 2, but the present invention is not limited thereto. According to some embodiments, one or more steps may be added, deleted, or changed in any of the respective working flows of the host device 50 and the memory device 100 as shown in FIG. 2.

According to some embodiments, a firmware code of the memory device 100 (e.g., the memory controller 110) may comprise a combination of at least one portion (e.g., a portion or all) of the multiple ISP codes, but the present invention is not limited thereto.

According to some embodiments, the memory device 100 (e.g., the memory controller 110, and more particularly, the microprocessor 112 running the compatibility management ISP code 110CM) may control a target firmware version of the firmware code in the compatibility management (e.g., the compatibility management function) to be a first predetermined firmware version among multiple predetermined firmware versions of the firmware code by default, and selectively switch the target firmware version from the first predetermined firmware version to a second predetermined firmware version among the multiple predetermined firmware versions according to the detection result of the detecting operation. For example, the first predetermined firmware version and the second predetermined firmware version may be associated with a newer version and an older version among the multiple predetermined versions of the UFS specification, such as UFS 3.1 and UFS 3.0, respectively, but the present invention is not limited thereto. For another example, the first predetermined firmware version and the second predetermined firmware version may be associated with the older version and the newer version among the multiple predetermined versions of the UFS specification, such as UFS 3.0 and UFS 3.1, respectively.

TABLE 1

| Bit Byte | 7 | 6 | 5 | 4 | 3 | 2 | 1 | 0 |
|---|---|---|---|---|---|---|---|---|
| 0 | OPERATION CODE (3Bh) ||||||||
| 1 | Reserved |||| MODE ||||
| 2 | BUFFER ID ||||||||
| 3 | (MSB) | BUFFER OFFSET |||||||
| 4 | | | | | | | | |
| 5 | | | | | | | | (LSB) |
| 6 | (MSB) | PARAMETER LIST LENGTH |||||||
| 7 | | | | | | | | |
| 8 | | | | | | | | (LSB) |
| 9 | CONTROL = 00h ||||||||

Table 1 illustrates an example of the format of the write buffer command, where there may be multiple fields in Bytes 0-9 in this format, and any of Bytes 0-9 may comprise Bits 7-0. Some fields of this format may be described as follows:

(1) the field "OPERATION CODE" may carry an operation code such as 3Bh (e.g., the symbol "h" indicates that the value is a hexadecimal value);
(2) the field "MODE" in Bits 4-0 of Byte 1 may carry a mode;
(3) the field "BUFFER ID" in Byte 2 may carry a buffer identifier (ID);
(4) the field "BUFFER OFFSET" in Bytes 3-5, from the most significant bit (MSB) of Byte 3 to the least significant bit (LSB) of Byte 5, may carry a buffer offset;
(5) the field "PARAMETER LIST LENGTH" in Bytes 6-8, from the MSB of Byte 6 to the LSB of Byte 8, may carry a parameter list length; and
(6) the field "CONTROL" in Byte 9 may carry a control code such as 00h;

but the present invention is not limited thereto. For example, the field "Reversed" in Bits 7-5 of Byte 1 may be configured to carry a UFS version (e.g., UFS 3.0 or UFS 3.1) of a target host device in an end-user phase. For better comprehension, the host device 50 can be arranged to play the role of the target host device, and the target host device may be implemented to have a circuitry architecture (e.g., multiple corresponding sub-circuits) similar to or the same as that of the host device 50. For brevity, similar descriptions for this embodiment are not repeated in detail here.

Figure 3:
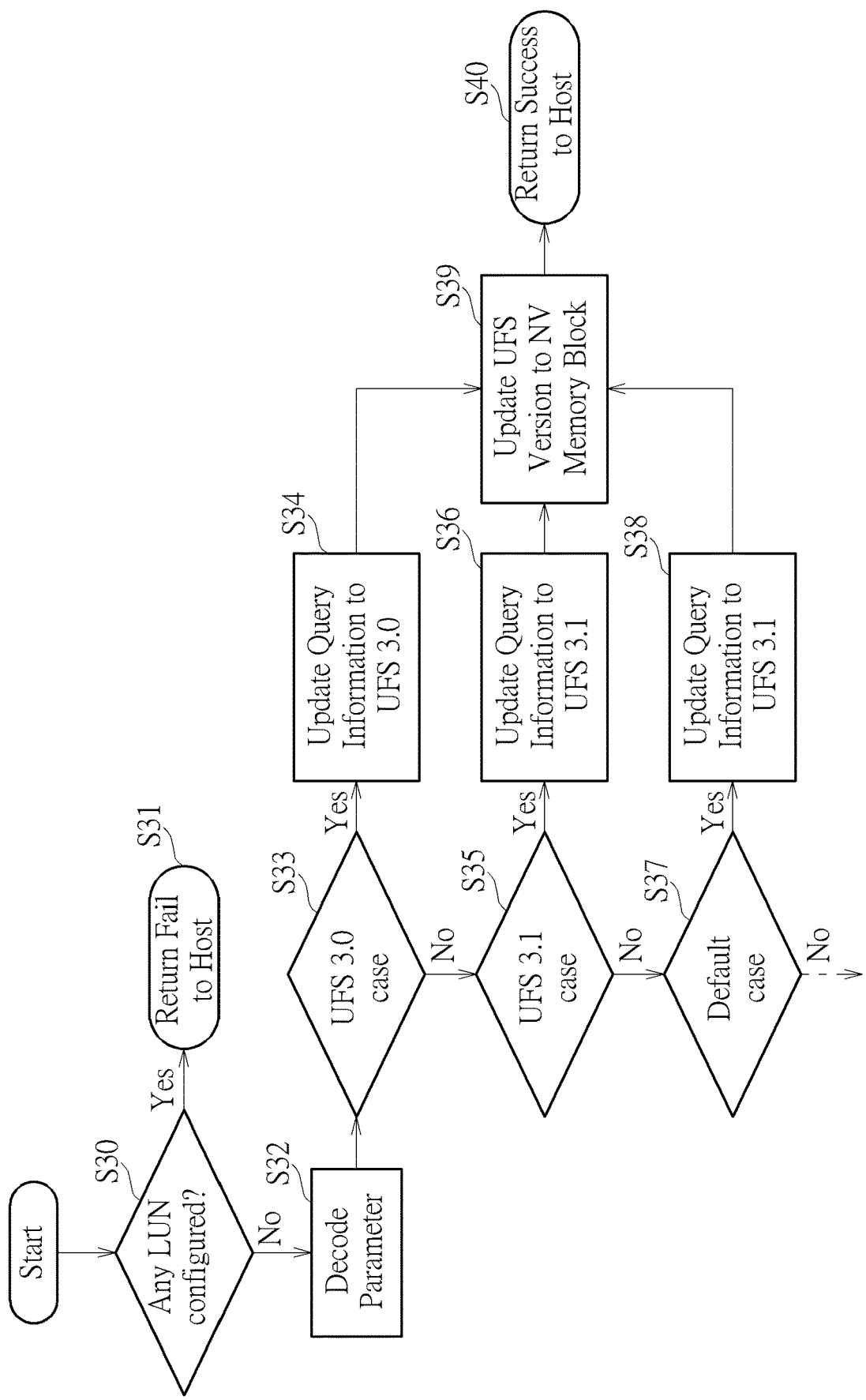
FIG. 3 illustrates a working flow of the method for performing communications specification version control of the memory device in the predetermined communications architecture with aid of compatibility management according to an embodiment of the present invention.

FIG. 3 illustrates a working flow of the method for performing communications specification version control of the memory device in the predetermined communications architecture (e.g., the UFS communications architecture) with aid of compatibility management according to an embodiment of the present invention. For example, the device-side compatibility management procedure mentioned in Step S22 shown in FIG. 2 may comprise at least one portion (e.g., a portion or all) of the working flow shown in FIG. 3, such as Steps S30 and S32-S39, but the present invention is not limited thereto. Under control of the microprocessor 112 running the compatibility management ISP code 110CM, the memory device 100 (e.g., the memory controller 110) may operate according to the working flow shown in FIG. 3, and more particularly, perform one or more operations of one or more steps among Steps S30-S40 in this working flow and return the processing result of the compatibility management (e.g., the compatibility management function) at any step of Steps S31 and S40.

In Step S30, the memory device 100 (e.g., the memory controller 110) may check whether any logical unit number (LUN) of multiple LUNs (e.g., the LUNs LUN0-LUN31) of the memory device 100 has been allocated or configured (labeled "Any LUN configured" for brevity). If Yes, Step S31 is entered, so the firmware (FW) may stop this procedure such as the device-side compatibility management procedure and return the processing result at Step S31; if No, Step S32 is entered.

In Step S31, the memory device 100 (e.g., the memory controller 110) may return the processing result "Fail" (e.g., an error code) to the host device 50 (labeled "Return Fail to Host" for brevity).

In Step S32, the memory device 100 (e.g., the memory controller 110) may decode at least one parameter (e.g., one or more parameters) from the first command (e.g., the vendor specific command or the read descriptor request), for determining the UFS version of the target host device, where a first parameter of the aforementioned at least one parameter may indicate the UFS version of the target host device. For example, the first command may represent the vendor specific command (e.g., the vendor-defined command), and the first parameter may represent the UFS version carried by the field "Reversed" of the format illustrated in Table 1. For another example, the first command may represent the read descriptor request, and the first parameter may represent a UFS-version-dependent parameter, such as a certain parameter that may vary with respect to the version of the UFS specification, where the UFS-version-dependent parameter may be used for determining the UFS version of the target host device (e.g., the host device 50).

In Step S33, according to the first parameter, the memory device 100 (e.g., the memory controller 110) may check whether it is the case of UFS 3.0 (labeled "UFS 3.0 case" for brevity). If Yes, which means it is determined that the UFS version of the target host device is UFS 3.0, Step S34 is entered; if No, Step S35 is entered.

In Step S34, when it is determined that the UFS version of the target host device is UFS 3.0, the memory device 100 (e.g., the memory controller 110) may configure a target UFS version of the memory device 100 to be UFS 3.0, and more particularly, update the associated query information (e.g., the query descriptor/attribute parameters) of the memory device 100 to UFS 3.0 (labeled "Update Query Information to UFS 3.0" for brevity), to allow the memory device 100 to operate according to the updated query information afterward (e.g., in the end-user phase).

In Step S35, according to the first parameter, the memory device 100 (e.g., the memory controller 110) may check whether it is the case of UFS 3.1 (labeled "UFS 3.1 case" for brevity). If Yes, which means it is determined that the UFS version of the target host device is UFS 3.1, Step S36 is entered; if No, Step S37 is entered.

In Step S36, when it is determined that the UFS version of the target host device is UFS 3.1, the memory device 100 (e.g., the memory controller 110) may configure the target UFS version of the memory device 100 to be UFS 3.1, and more particularly, update the associated query information (e.g., the query descriptor/attribute parameters) of the memory device 100 to UFS 3.1 (labeled "Update Query Information to UFS 3.1" for brevity), to allow the memory device 100 to operate according to the updated query information afterward (e.g., in the end-user phase).

In Step S37, according to at least one default setting, the memory device 100 (e.g., the memory controller 110) may check whether it is a default case such as UFS 3.1 (labeled "Default case" for brevity). If Yes, which means it is determined that the UFS version of the target host device is UFS 3.1, Step S38 is entered; if No, the memory device 100 (e.g., the memory controller 110) may trigger a predetermined operation. For example, regarding triggering the predetermined operation, Step S31 may be entered to return the processing result "Fail" (e.g., the error code) to the host device 50, where the arrow depicted with a dashed line below Step S37 may be directed to Step S31 to form a partial working flow from Step S37 to Step S31, but the present invention is not limited thereto. For another example, the memory device 100 (e.g., the memory controller 110) may be arranged to always determine that it is the default case such as UFS 3.1 in Step S37. In some embodiments, Step S37 may be omitted, and the partial working flow from Step S35 to Step S37 and the partial working flow from Step S37 to Step S38 may be integrated into the same partial working flow, such as a partial working flow from Step S35 to Step S38.

In Step S38, when it is determined that the UFS version of the target host device is UFS 3.1, the memory device 100 (e.g., the memory controller 110) may configure the target UFS version of the memory device 100 to be UFS 3.1, and more particularly, update the associated query information (e.g., the query descriptor/attribute parameters) of the memory device 100 to UFS 3.1 (labeled "Update Query Information to UFS 3.1" for brevity), to allow the memory device 100 to operate according to the updated query information afterward (e.g., in the end-user phase).

In Step S39, the memory device 100 (e.g., the memory controller 110) may update the configuration of the target UFS version (e.g., one of UFS 3.0 and UFS 3.1) of the memory device 100 into at least one predetermined block (e.g., a system block) among the plurality of blocks in the NV memory 120 (labeled "Update UFS Version to NV Memory Block" for brevity), to allow the memory device 100 to be compatible with the target host device.

In Step S40, the memory device 100 (e.g., the memory controller 110) may return the processing result "Success" to the host device 50 (labeled "Return Success to Host" for brevity).

For better comprehension, the method may be illustrated with the working flow shown in FIG. 3, but the present invention is not limited thereto. According to some embodiments, one or more steps may be added, deleted, or changed in the working flow shown in FIG. 3.

According to some embodiments, the host device 50 can be arranged to play the role of the target host device. More particularly, the host device 50 may trigger initialization of the memory device 100 or may need to perform one or more descriptor operations on the memory device 100, and therefore may need to send a Query Request UFS Protocol Information Unit (UPIU) regarding a descriptor first to wait for a Query Response UPIU carrying the descriptor, for example, the descriptor may be implemented with any of a Device Descriptor, a Configuration Descriptor, a Geometry Descriptor, a Unit Descriptor, etc. In addition, the memory device 100 (e.g., the memory controller 110) may obtain a certain parameter carried by a field "LENGTH" in a Query Request (e.g., the Query Request UPIU) sent by the host device 50 to be the first parameter, and determine whether the UFS version of the host device 50 is UFS 3.0 or UFS 3.1 according to the first parameter, in order to configure the target UFS version of the memory device 100 to be the UFS version of the host device 50 to achieve compatibility with the host device 50.

According to some embodiments, as the Query Request may be regarded as a command, the Query Request may also be referred to as the Query Request command.

According to some embodiments, the host device 50 can be arranged to play the role of the target host device. More particularly, the first command mentioned in Step S11 and the first response mentioned in Step S31 may represent the Query Request (e.g., a Query Request UPIU) and a Query Response (e.g., the Query Response UPIU), respectively. The host device 50 may prepare packet contents of 32 bytes in the Query Request (e.g., the Query Request UPIU) according to the UFS specification, where some bytes (e.g., Bytes 12-27) may vary with respect to Query operation code (opcode).

TABLE 2A

QUERY REQUEST UPIU

| 0 | 1 | 2 | 3 |
|---|---|---|---|
| xx01 0110b | Flags | Reserved | Task Tag |
| 4 | 5 | 6 | 7 |
| Reserved | Query Function | Reserved | Reserved |
| 8 | 9 | 10 (MSB) | 11 (LSB) |
| Total EHS Length (00h) | Reserved | Data Segment Length | |
| 12 | 13 | 14 | 15 |
| Transaction Specific Fields | | | |
| 16 | 17 | 18 | 19 |
| Transaction Specific Fields | | | |
| 20 | 21 | 22 | 23 |
| Transaction Specific Fields | | | |
| 24 | 25 | 26 | 27 |
| Transaction Specific Fields | | | |
| 28 | 29 | 30 | 31 |
| Reserved | | | |

TABLE 2B

QUERY RESPONSE UPIU

| 0 | 1 | 2 | 3 |
|---|---|---|---|
| xx11 0110b | Flags | Reserved | Task Tag |
| 4 | 5 | 6 | 7 |
| Reserved | Query Function | Query Response | Reserved |
| 8 | 9 | 10 (MSB) | 11 (LSB) |
| Total EHS Length (00h) | Device Information | Data Segment Length | |
| 12 | 13 | 14 | 15 |
| Transaction Specific Fields | | | |
| 16 | 17 | 18 | 19 |
| Transaction Specific Fields | | | |
| 20 | 21 | 22 | 23 |
| Transaction Specific Fields | | | |

TABLE 2B-continued

| QUERY RESPONSE UPIU | | | |
|---|---|---|---|
| 24 | 25 | 26 | 27 |
| | Transaction Specific Fields | | |
| 28 | 29 | 30 | 31 |
| | Reserved | | |

Table 2A illustrates an example of the format of the Query Request UPIU, and Table 2B illustrates an example of the format of the Query Response UPIU. The first field labeled "xx01 0110b" in the Query Request UPIU and the first field labeled "xx11 0110b" may represent predetermined values, respectively, where the field names of the other fields shown in Tables 2A and 2B may indicate the meanings of these fields, respectively. For example, the Transaction Specific Fields in Bytes 12-27 in the format of the Query Request UPIU as shown in Table 2A may vary with respect to the Query opcode. For a read device descriptor (which may also be referred to as the read descriptor for brevity) indicated by a read descriptor opcode, an example of the format of the Transaction Specific Fields may be illustrated with Table 3 below:

TABLE 3

| Transaction Specific Fields for READ DESCRIPTOR OPCODE | | | |
|---|---|---|---|
| 12 | 13 | 14 | 15 |
| 01h | DESCRIPTOR IDN | INDEX | SELECTOR |
| 16 | 17 | 18 (MSB) | 19 (LSB) |
| Reserved | Reserved | LENGTH | |
| 20 | 21 | 22 | 23 |
| | Reserved | | |
| 24 | 25 | 26 | 27 |
| | Reserved | | |

The field "DESCRIPTOR IDN" in the format shown in Table 3 may carry a descriptor ID indicating a certain type of descriptor. The host device 50 may set the descriptor ID carried by the field "DESCRIPTOR IDN" in Byte 13 of the Query Request (e.g., the Query Request UPIU) as a target descriptor ID corresponding to a target type of descriptor among of multiple predetermined descriptor IDs respectively corresponding to multiple types of descriptors (e.g., the Device Descriptor, the Configuration Descriptor, the Geometry Descriptor, and the Unit Descriptor), to indicate that the corresponding Query Response (e.g., the corresponding Query Response UPIU) should carry the target type of descriptor, for example, starting from Byte 32 of the Query Response (e.g., the Query Response UPIU). In addition, the host device 50 may set the parameter carried by the field "LENGTH" in Bytes 18-19 of the Query Request (e.g., the Query Request UPIU) as the size of the target type of descriptor, where the target type of descriptor carried by the corresponding Query Response (e.g., the corresponding Query Response UPIU) should have this size.

For example, the host device 50 may set the descriptor ID carried by the field "DESCRIPTOR IDN" to be 00h (i.e. 0x00) to indicate that the descriptor carried by the corresponding Query Response UPIU sent from the memory device 100 should be the Device Descriptor. For another example, the host device 50 may set the descriptor ID carried by the field "DESCRIPTOR IDN" to be 01h (i.e. 0x01) to indicate that the descriptor carried by the corresponding Query Response UPIU sent from the memory device 100 should be the Configuration Descriptor. For yet another example, the host device 50 may set the descriptor ID carried by the field "DESCRIPTOR IDN" to be 07h (i.e. 0x07) to indicate that the descriptor carried by the corresponding Query Response UPIU sent from the memory device 100 should be the Geometry Descriptor.

TABLE 4

| DEVICE DESCRIPTOR | | | | | |
|---|---|---|---|---|---|
| Offset | Size | Name | MDV [1] | User Conf. | Description |
| 00h | 1 | bLength | 40h | No | Size of this descriptor |
| 01h | 1 | bDescriptorIDN | 00h | No | Device Descriptor Type Identifier |
| 02h | 1 | bDevice | 00h | No | Device type 00h: Device Others: Reserved |
| 03h | 1 | bDeviceClass | 00h | No | UFS Device Class 00h: Mass Storage Others: Reserved |

TABLE 5

| Configuration Descriptor Header | | | | |
|---|---|---|---|---|
| Offset | Size | Name | MDV [1] | Description |
| 00h | 1 | bLength | 90h | Size of this descriptor |
| 01h | 1 | bDescriptorIDN | 01h | Configuration Descriptor Type Identifier |
| 02h | 1 | bConfDescContinue | 00h | 00h: This value indicates that this is the last Configuration Descriptor in a sequence of write descriptor query requests. Device shall perform internal configuration based on received Configuration Descriptor(s). 01h: This value indicates that this is not the last Configuration Descriptor in a sequence of write descriptor query requests. Other Configuration Descriptors will be sent by host. Therefore the device should not perform the internal configuration yet. |
| 02h: 0Fh | 14 | Reserved | | |

NOTE

[1] The column "MDV" (Manufacturer Default Value) specifies parameter values after device manufacturing.

TABLE 6

GEOMETRY DESCRIPTOR

| Offset | Size | Name | Value | Description |
|---|---|---|---|---|
| 00h | 1 | bLength | 48h | Size of this descriptor |
| 01h | 1 | bDescriptorIDN | 07h | Geometry Descriptor Type Identifier |
| 02h | 1 | bMediaTechnology | 00h | Reserved |
| 03h | 1 | Reserved | 00h | Reserved |

TABLE 7

DEVICE DESCRIPTOR

| Offset | Size | Name | MDV [1] | User Conf. | Description |
|---|---|---|---|---|---|
| 00h | 1 | bLength | 59h | No | Size of this descriptor |
| 01h | 1 | bDescriptorIDN | 00h | No | Device Descriptor Type Identifier |
| 02h | 1 | bDevice | 00h | No | Device type 00h: Device Others: Reserved |
| 03h | 1 | bDeviceClass | 00h | No | UFS Device Class 00h: Mass Storage Others: Reserved |

TABLE 8

Configuration Descriptor Header

| Offset | Size | Name | MDV [1] | Description |
|---|---|---|---|---|
| 00h | 1 | bLength | E6h | Size of this descriptor |
| 01h | 1 | bDescriptorIDN | 01h | Configuration Descriptor Type Identifier |
| 02h | 1 | bConfDescContinue | 00h | 00h: This value indicates that this is the last Configuration Descriptor in a sequence of write descriptor query requests. Device shall perform internal configuration based on received Configuration Descriptor(s). 01h: This value indicates that this is not the last Configuration Descriptor in a sequence of write descriptor query requests. Other Configuration Descriptors will be sent by host. Therefore the device should not perform the internal configuration yet. |
| 02h: 0Fh | 14 | Reserved | | |

NOTE

[1] The column "MDV" (Manufacturer Default Value) specifies parameter values after device manufacturing.

TABLE 9

GEOMETRY DESCRIPTOR

| Offset | Size | Name | Value | Description |
|---|---|---|---|---|
| 00h | 1 | bLength | 57h | Size of this descriptor |
| 01h | 1 | bDescriptorIDN | 07h | Geometry Descriptor Type Identifier |
| 02h | 1 | bMediaTechnology | 00h | Reserved |
| 03h | 1 | Reserved | 00h | Reserved |
| 04h | 8 | qTotalRawDeviceCapacity | Device specific | Total Raw Device Capacity Total memory quantity available to the user to configure the device logical units (RPMB excluded). It is expressed in unit of 512 bytes |

Tables 4-6 illustrate examples of the formats of the UFS 3.0 Device Descriptor, the UFS 3.0 Configuration Descriptor Header, and the UFS 3.0 Geometry Descriptor, respectively, and Tables 7-9 illustrate examples of the formats of the UFS 3.1 Device Descriptor, the UFS 3.1 Configuration Descriptor Header, and the UFS 3.1 Geometry Descriptor, respectively, where the first parameter may represent the manufacturer default value (MDV) carried by the field "bLength" in any of these format respectively shown in Tables 4-9, but the present invention is not limited thereto. For better comprehension, the host device 50 may fill a certain value into the field "LENGTH" in Bytes 18-19 (as shown in Table 3) among the Transaction Specific Fields in Bytes 12-27 of the Query Request UPIU (as shown in Table 2A) according to the UFS version of the host device 50. Taking the MDV (e.g., 40h) carried by the field "bLength" shown in Table 4 and the MDV (e.g., 59h) carried by the field "bLength" shown in Table 7 as examples, as the size of the UFS 3.0 Device Descriptor is equal to 0x40 (e.g., bLength=40h) and the size of the UFS 3.1 Device Descriptor is equal to 0x59 (e.g., bLength=59h), the parameter {0x00, 0x59} carried by the field "LENGTH" in Bytes 18-19 of the Query Request for the read UFS 3.1 device descriptor and the parameter {0x00, 0x40} carried by the field "LENGTH" in Bytes 18-19 of the Query Request for the read UFS 3.0 device descriptor are different from each other.

TABLE 10

| Byte 0-3 | 0x16 | 0x00 | 0x00 | 0x80 |
| Byte 4-7 | 0x00 | 0x01 | 0x00 | 0x00 |
| Byte 8-11 | 0x00 | 0x00 | 0x00 | 0x00 |
| Byte 12-15 | 0x01 | 0x00 | 0x00 | 0x00 |
| Byte 16-19 | 0x00 | 0x00 | 0x00 | 0x59 |
| Byte 20-23 | 0x00 | 0x00 | 0x00 | 0x00 |
| Byte 24-27 | 0x00 | 0x00 | 0x00 | 0x00 |
| Byte 28-31 | 0x00 | 0x00 | 0x00 | 0x00 |

TABLE 11

| Byte 0-3 | 0x16 | 0x00 | 0x00 | 0x80 |
| Byte 4-7 | 0x00 | 0x01 | 0x00 | 0x00 |
| Byte 8-11 | 0x00 | 0x00 | 0x00 | 0x00 |
| Byte 12-15 | 0x01 | 0x00 | 0x00 | 0x00 |
| Byte 16-19 | 0x00 | 0x00 | 0x00 | 0x40 |
| Byte 20-23 | 0x00 | 0x00 | 0x00 | 0x00 |
| Byte 24-27 | 0x00 | 0x00 | 0x00 | 0x00 |
| Byte 28-31 | 0x00 | 0x00 | 0x00 | 0x00 |

Table 10 illustrates an example of the Query Request for the read UFS 3.1 device descriptor, and Table 11 illustrates an example of the Query Request for the read UFS 3.0 device descriptor, but the present invention is not limited thereto. Please note that the parameter {0x00, 0x59} carried by Bytes 18-19 shown in Table 10 (i.e. the field "LENGTH" of the Query Request for the read UFS 3.1 device descriptor) and the parameter {0x00, 0x40} carried by Bytes 18-19 shown in Table 11 (i.e. the field "LENGTH" of the Query Request for the read UFS 3.0 device descriptor) are different from each other.

In addition, the memory device 100 (e.g., the memory controller 110) may fill a certain value into the field "LENGTH" in Bytes 18-19 of the Query Response UPIU according to the target UFS version of the memory device 100. For example, in response to the Query Request for the read UFS 3.1 device descriptor, the memory device 100 (e.g., the memory controller 110) may send the Query Response for the read UFS 3.1 device descriptor. For another example, in response to the Query Request for the read UFS 3.0 device descriptor, the memory device 100 (e.g., the memory controller 110) may send the Query Response for the read UFS 3.0 device descriptor. Similarly, the parameter {0x00, 0x59} carried by the field "LENGTH" in Bytes 18-19 of the Query Response for the read UFS 3.1 device descriptor and the parameter {0x00, 0x40} carried by the field "LENGTH" in Bytes 18-19 of the Query Response for the read UFS 3.0 device descriptor are different from each other.

TABLE 12

| Byte 0-3 | 0x36 | 0x00 | 0x00 | 0x80 |
| Byte 4-7 | 0x00 | 0x01 | 0x00 | 0x00 |
| Byte 8-11 | 0x00 | 0x00 | 0x00 | 0x59 |
| Byte 12-15 | 0x01 | 0x00 | 0x00 | 0x00 |
| Byte 16-19 | 0x00 | 0x00 | 0x00 | 0x59 |
| Byte 20-23 | 0x00 | 0x00 | 0x00 | 0x00 |
| Byte 24-27 | 0x00 | 0x00 | 0x00 | 0x00 |
| Byte 28-31 | 0x00 | 0x00 | 0x00 | 0x00 |
| Byte 32-35 | 0x59 | 0x00 | 0x00 | 0x00 |
| Byte 36-120 | . . . | . . . | . . . | . . . |

TABLE 13

| Byte 0-3 | 0x36 | 0x00 | 0x00 | 0x80 |
| Byte 4-7 | 0x00 | 0x01 | 0x00 | 0x00 |
| Byte 8-11 | 0x00 | 0x00 | 0x00 | 0x40 |
| Byte 12-15 | 0x01 | 0x00 | 0x00 | 0x00 |
| Byte 16-19 | 0x00 | 0x00 | 0x00 | 0x40 |
| Byte 20-23 | 0x00 | 0x00 | 0x00 | 0x00 |
| Byte 24-27 | 0x00 | 0x00 | 0x00 | 0x00 |
| Byte 28-31 | 0x00 | 0x00 | 0x00 | 0x00 |
| Byte 32-35 | 0x40 | 0x00 | 0x00 | 0x00 |
| Byte 36-95 | . . . | . . . | . . . | . . . |

Table 12 illustrates an example of the Query Response for the read UFS 3.1 device descriptor, and Table 13 illustrates an example of the Query Response for the read UFS 3.0 device descriptor, where the symbol " . . . " may indicate that some table contents may be omitted, but the present invention is not limited thereto. Please note that the parameter {0x00, 0x59} carried by Bytes 18-19 shown in Table 12 (i.e. the field "LENGTH" of the Query Response for the read UFS 3.1 device descriptor) and the parameter {0x00, 0x40} carried by Bytes 18-19 shown in Table 13 (i.e. the field "LENGTH" of the Query Response for the read UFS 3.0 device descriptor) are different from each other. In addition, the parameter {0x00, 0x59} carried by Bytes 18-19 shown in Table 12 (i.e. the field "LENGTH" of the Query Response for the read UFS 3.1 device descriptor) is equal to the parameter {0x00, 0x59} carried by Bytes 18-19 shown in Table 10 (i.e. the field "LENGTH" of the Query Request for the read UFS 3.1 device descriptor), and the parameter {0x00, 0x40} carried by Bytes 18-19 shown in Table 13 (i.e. the field "LENGTH" of the Query Response for the read UFS 3.0 device descriptor) is equal to the parameter {0x00, 0x40} carried by Bytes 18-19 shown in Table 11 (i.e. the field "LENGTH" of the Query Request for the read UFS 3.0 device descriptor).

The memory device 100 (e.g., the memory controller 110) may use multiple consecutive bytes starting from Byte 32 of the Query Response UPIU to return descriptor information (e.g., the information of the descriptor) to the host device 50, where the total byte count of the multiple consecutive bytes may be equal to the size of the descriptor carried by the Query Response UPIU. Taking the read device descriptor as an example, Byte 32 may represent the field "bLength" (e.g., the size of this descriptor) and Byte 33 may represent the field "bDescriptorIDN" (e.g., the descriptor ID of this descriptor), and the rest can be deduced by analogy. For the Query Response for the read UFS 3.1 device descriptor as shown in Table 12, the size of this descriptor is equal to 0x59 (e.g., bLength=59h, as shown in Table 7), so both of the last byte of the Query Response (e.g., the Query Response UPIU) and the last byte of this descriptor can be Byte 120 (e.g., (5*16+9)+31=120). For the Query Response for the read UFS 3.0 device descriptor as shown in Table 13, the size of this descriptor is equal to 0x40 (e.g., bLength=40h, as shown in Table 4), so both of the last byte of the Query Response (e.g., the Query Response UPIU) and the last byte of this descriptor can be Byte 95 (e.g., (4*16+0)+31=95). Regarding the field "bLength" of the descriptors, the differences between UFS 3.0 and UFS 3.1 can be seen from Tables 4-9.

Figure 4:
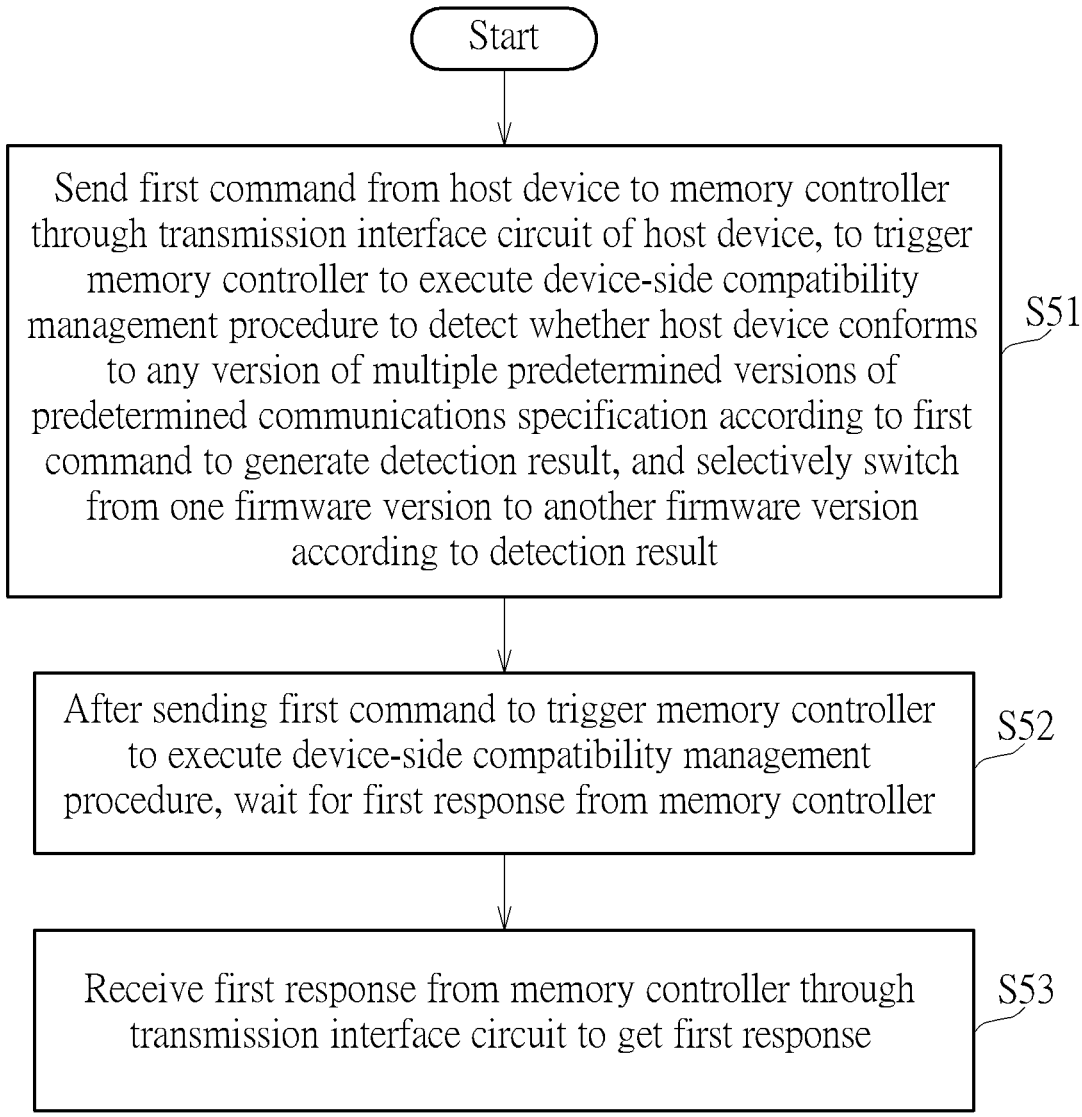
FIG. 4 illustrates a host-side working flow of the method according to an embodiment of the present invention.

FIG. 4 illustrates a host-side working flow of the method according to an embodiment of the present invention. The computer-readable medium 52M stores the program code 52C which causes the host device 50 (e.g., the processor 52) to operate according to the method when executed by the host device 50 (e.g., the processor 52). The host device 50 (e.g., the processor 52 running the program code 52C) at the host side can trigger the execution of the device-side compatibility management procedure at the device side. In addition, the memory controller 110 can be arranged to load the compatibility management ISP code 110CM from the NV memory 120 into at least one storage region (e.g., the program code region in the RAM 116) within the memory controller 110 in advance, for example, during the initialization of the memory device 100 (e.g., the memory controller 110), where the compatibility management ISP code causes the memory controller 110 to have the compatibility management function when executed by the memory controller 110, but the present invention is not limited thereto. The memory controller 110 can load the compatibility management ISP code 110CM from the NV memory 120 into the at least one storage region at any moment before the execution of the device-side compatibility management procedure is triggered by the host device 50, for example, immediately before the execution of the device-side compatibility management procedure is triggered by the host device 50.

In Step S51, the host device 50 (e.g., the processor 52 running the program code 52C) can send a first command (e.g., the first command mentioned in the embodiment shown in FIG. 2) from the host device 50 to the memory controller 110 through the transmission interface circuit 58 of the host device 50, to trigger the memory controller 110 to execute the device-side compatibility management procedure of the compatibility management function to detect whether the host device 50 conforms to any version of multiple predetermined versions (e.g., UFS 3.0 and UFS 3.1) of a predetermined communications specification (e.g., the UFS specification) according to the first command to generate a detection result, and selectively switch from one firmware version to another firmware version according to the detection result.

For example, the first command may represent the vendor specific command such as the vendor-defined command. More particularly, the vendor specific command can be configured for indicating that the host device 50 conforms to a first version (e.g., one of UFS 3.0 and UFS 3.1) of the multiple predetermined versions of the predetermined communications specification among all versions of the predetermined communications specification. According to the vendor specific command, the memory controller 110 executing the device-side compatibility management procedure can determine that the host device 50 conforms to the first version.

For another example, the first command may represent a first predetermined request (e.g., the read descriptor request) conforming to each predetermined version of the multiple predetermined versions of the predetermined communications specification. According to one or more contents carried by the first predetermined request, the memory controller 110 can detect whether the host device 50 conforms to the any version of the multiple predetermined versions of the predetermined communications specification.

In Step S52, after sending the first command to trigger the memory controller 110 to execute the device-side compatibility management procedure, the host device 50 (e.g., the processor 52 running the program code 52C) can wait for a first response (e.g., the first response mentioned in the embodiment shown in FIG. 2) from the memory controller 110.

In Step S53, the host device 50 (e.g., the processor 52 running the program code 52C) can receive the first response from the memory controller 110 through the transmission interface circuit 58 to get the first response, where the first response is sent by the memory controller 110 to the host device 50 in response to the first command.

For example, the host device 50 sending the first command can trigger the execution of the device-side compatibility management procedure, causing the memory controller 110 to send the first response to the host device 50 to return the processing result of the compatibility management function to the host device 50. In addition, the device-side compatibility management procedure may comprise:

(1) performing at least one checking operation (e.g., one or more checking operations, such as the operations of Steps S33, S35 and/or S37) according to the first command to generate at least one checking result (e.g., one or more checking results) of the at least one checking operation, for determining the detection result, where the detection result indicates whether the host device 50 conforms to the first version (e.g., UFS 3.0 in Step S34, or UFS 3.1 in any of Steps S36 and S38) of the multiple predetermined versions of the predetermined communications specification;

(2) in response to the detection result indicating that the host device 50 conforms to the first version of the multiple predetermined versions of the predetermined communications specification, configuring a target firmware version (e.g., the target firmware version mentioned in some embodiments described above) of the memory device 100 to be a first firmware version (e.g., the first predetermined firmware version mentioned above, such as a firmware version corresponding to one of UFS 3.0 and UFS 3.1) associated with the first version of the multiple predetermined versions of the predetermined communications specification, for example, as described in any step among Steps S34, S36 and S38; and (3) updating the configuration of the target firmware version (e.g., the firmware version corresponding to one of UFS 3.0 and UFS 3.1) of the memory device 100 into the at least one predetermined block (e.g., the system block) among the plurality of blocks in the NV memory 120, to allow the memory device 100 to be compatible with the target host device such as the host device 50, for example, as described in Step S39;

but the present invention is not limited thereto. For example, the operation of configuring the target firmware version of the memory device 100 to be the first firmware version associated with the first version of the multiple predetermined versions of the predetermined communications specification may further comprise updating the associated query information (e.g., the query descriptor/attribute parameters) of the memory device 100 to be first query information (e.g., the query descriptor/attribute parameters corresponding to one of UFS 3.0 and UFS 3.1) associated with the first version of the multiple predetermined versions of the predetermined communications specification to allow the memory device 100 to operate according to the updated query information afterward, for example, as described in any step among Steps S34, S36 and S38. For brevity, similar descriptions for this embodiment are not repeated in detail here.

For better comprehension, the method may be illustrated with the host-side working flow shown in FIG. 4, but the present invention is not limited thereto. According to some embodiments, one or more steps may be added, deleted, or changed in the host-side working flow shown in FIG. 4.

Figure 5:
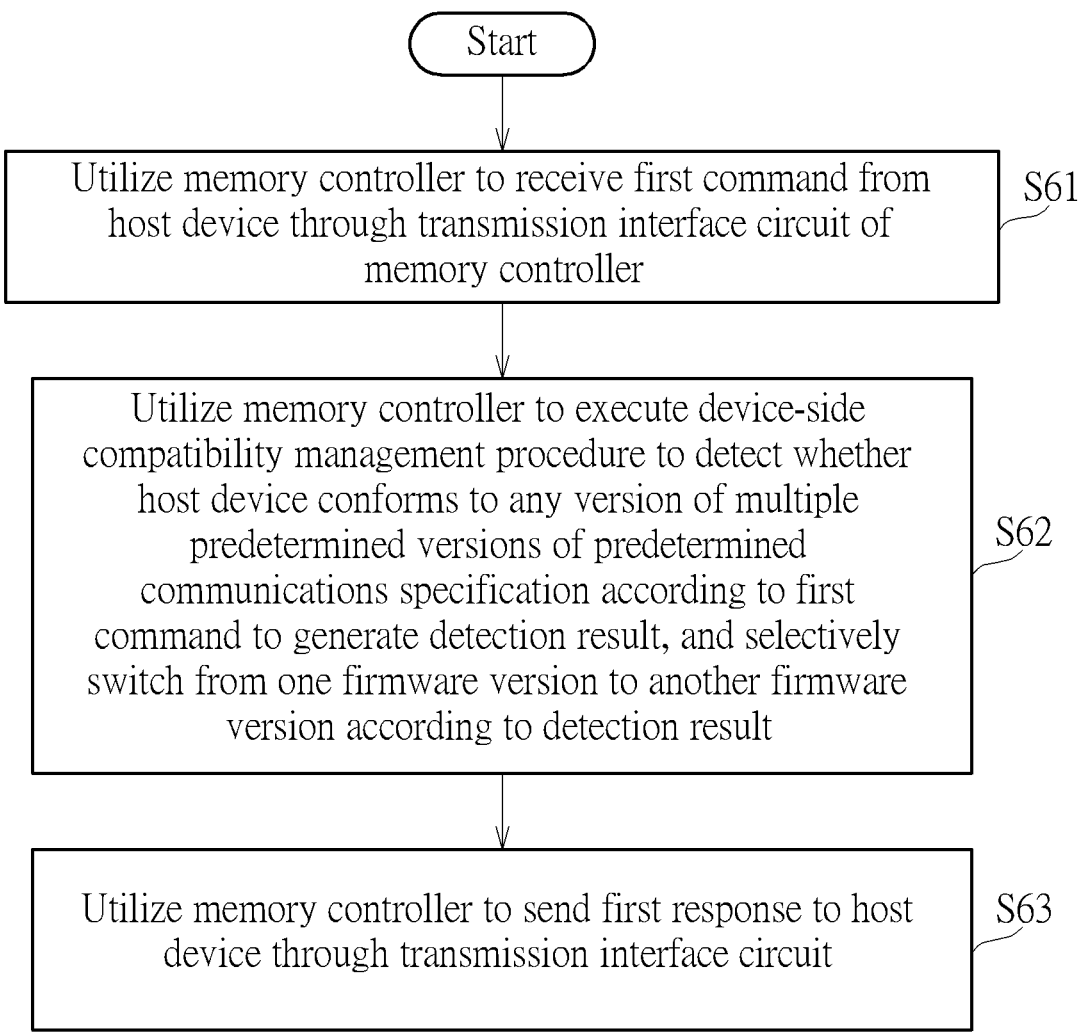
FIG. 5 illustrates a device-side working flow of the method according to an embodiment of the present invention.

FIG. 5 illustrates a device-side working flow of the method according to an embodiment of the present invention.

In Step S61, the memory device 100 can utilize the memory controller 110 (e.g., the microprocessor 112 running the compatibility management ISP code 110CM) to receive a first command (e.g., the first command mentioned in the embodiment shown in FIG. 2) from the host device 50 through the transmission interface circuit 118 of the memory controller 110. For example, the first command may represent the vendor specific command such as the vendor-defined command. For another example, the first command may represent the first predetermined request (e.g., the read descriptor request) conforming to each predetermined version of the multiple predetermined versions of the predetermined communications specification.

In Step S62, the memory device 100 can utilize the memory controller 110 (e.g., the microprocessor 112 running the compatibility management ISP code 110CM) to execute the device-side compatibility management procedure of the compatibility management function to detect whether the host device 50 conforms to any version of the multiple predetermined versions (e.g., UFS 3.0 and UFS 3.1) of the predetermined communications specification (e.g., the UFS specification) according to the first command to generate a detection result, and selectively switch from one firmware version to another firmware version according to the detection result. For example, in a situation where the first command represents the vendor specific command, the vendor specific command can be configured for indicating that the host device 50 conforms to the first version (e.g., one of UFS 3.0 and UFS 3.1) of the multiple predetermined versions of the predetermined communications specification among all versions of the predetermined communications specification. According to the vendor specific command, the memory controller 110 executing the device-side compatibility management procedure can determine that the host device 50 conforms to the first version. For another example, in a situation where the first command represents the first predetermined request (e.g., the read descriptor request) conforming to each predetermined version of the multiple predetermined versions of the predetermined communications specification, according to one or more contents carried by the first predetermined request, the memory controller 110 can detect whether the host device 50 conforms to the any version of the multiple predetermined versions of the predetermined communications specification.

In Step S63, the memory device 100 can utilize the memory controller 110 (e.g., the microprocessor 112 running the compatibility management ISP code 110CM) to send a first response (e.g., the first response mentioned in the embodiment shown in FIG. 2) to the host device 50 through the transmission interface circuit 118, where the first response is sent to the host device 50 in response to the first command. For example, the memory device 100 can utilize the memory controller 110 to send the first response to the host device 50 through the transmission interface circuit 118, to return the processing result of the compatibility management function to the host device 50. For brevity, similar descriptions for this embodiment are not repeated in detail here.

For better comprehension, the method may be illustrated with the device-side working flow shown in FIG. 5, but the present invention is not limited thereto. According to some embodiments, one or more steps may be added, deleted, or changed in the device-side working flow shown in FIG. 5.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing communications specification version control of a memory device in a predetermined communications architecture with aid of compatibility management, the method being applied to a memory controller of the memory device, the memory device comprising the memory controller and a non-volatile (NV) memory, the NV memory comprising at least one NV memory element, the method comprising:
    utilizing the memory controller to receive a first command from a host device through a transmission interface circuit of the memory controller;
    utilizing the memory controller to execute a device-side compatibility management procedure of a compatibility management function to detect whether the host device conforms to any version of multiple predetermined versions of a predetermined communications specification according to the first command to generate a detection result, and selectively switch from one firmware version to another firmware version according to the detection result; and
    utilizing the memory controller to send a first response to the host device through the transmission interface circuit, wherein the first response is sent to the host device in response to the first command;
    wherein the first command represents a first predetermined request which is implemented as a read descriptor request, wherein multiple fields of a predetermined format of the read descriptor request comprise:
        a first field, for carrying a first predetermined value;
        a flag field, for carrying at least one flag;
        a task tag field, for carrying at least one task tag;
        a first length field, for carrying a first length; and
        a second length field, for carrying a second length; and
    at least one other field reserved for at least one other purpose among the multiple fields is arranged to carry at least one parameter for indicating whether the host device conforms to the any version of the multiple predetermined versions of the predetermined communications specification.

2. The method of claim 1, wherein the multiple fields further comprise multiple transaction specific fields, wherein the at least one other field represents at least one transaction specific field among the multiple transaction specific fields.

3. The method of claim 1, wherein the first predetermined request conforms to each predetermined version of the multiple predetermined versions of the predetermined communications specification; and according to one or more contents carried by the first predetermined request, the memory controller detects whether the host device conforms to the any version of the multiple predetermined versions of the predetermined communications specification, wherein the one or more contents comprise the at least one parameter carried in the at least one other field.

4. The method of claim 1, wherein utilizing the memory controller to send the first response to the host device through the transmission interface circuit further comprises:
utilizing the memory controller to send the first response to the host device through the transmission interface circuit, to return a processing result of the compatibility management function to the host device.

5. The method of claim 1, wherein the memory controller is arranged to load a compatibility management in-system programing (ISP) code from the NV memory into at least one storage region within the memory controller; and the compatibility management ISP code causes the memory controller to have the compatibility management function when executed by the memory controller.

6. The method of claim 1, wherein the device-side compatibility management procedure comprises:
performing at least one checking operation according to the first command to generate at least one checking result of the at least one checking operation, for determining the detection result, wherein the detection result indicates whether the host device conforms to a first version of the multiple predetermined versions of the predetermined communications specification;
in response to the detection result indicating that the host device conforms to the first version of the multiple predetermined versions of the predetermined communications specification, configuring a target firmware version of the memory device to be a first firmware version associated with the first version of the multiple predetermined versions of the predetermined communications specification; and
updating the configuration of the target firmware version of the memory device into at least one predetermined block among a plurality of blocks in the NV memory, to allow the memory device to be compatible with the host device.

7. The method of claim 6, wherein configuring the target firmware version of the memory device to be the first firmware version associated with the first version of the multiple predetermined versions of the predetermined communications specification further comprises:
updating query information of the memory device to be first query information associated with the first version of the multiple predetermined versions of the predetermined communications specification, to allow the memory device to operate according to the updated query information afterward.

8. A memory controller of a memory device, the memory device comprising the memory controller and a non-volatile (NV) memory, the NV memory comprising at least one NV memory element, the memory controller comprising:
a processing circuit, arranged to control the memory controller according to a plurality of host commands from a host device, to allow the host device to access the NV memory through the memory controller, wherein the processing circuit is arranged to perform communications specification version control of the memory device in a predetermined communications architecture with aid of compatibility management; and
a transmission interface circuit, arranged to perform communications with the host device;
wherein:
the memory controller receives a first command from the host device through the transmission interface circuit of the memory controller;
the memory controller executes a device-side compatibility management procedure of a compatibility management function to detect whether the host device conforms to any version of multiple predetermined versions of a predetermined communications specification according to the first command to generate a detection result, and selectively switch from one firmware version to another firmware version according to the detection result; and
the memory controller sends a first response to the host device through the transmission interface circuit, wherein the first response is sent to the host device in response to the first command;
wherein the first command represents a first predetermined request which is implemented as a read descriptor request, wherein multiple fields of a predetermined format of the read descriptor request comprise:
a first field, for carrying a first predetermined value;
a flag field, for carrying at least one flag;
a task tag field, for carrying at least one task tag;
a first length field, for carrying a first length; and
a second length field, for carrying a second length; and
at least one other field reserved for at least one other purpose among the multiple fields is arranged to carry at least one parameter for indicating whether the host device conforms to the any version of the multiple predetermined versions of the predetermined communications specification.

9. A memory device, comprising:
a non-volatile (NV) memory, configured to store information, wherein the NV memory comprises at least one NV memory element; and
a memory controller, coupled to the NV memory, configured to control operations of the memory device, wherein the memory controller comprises:
a processing circuit, arranged to control the memory controller according to a plurality of host commands from a host device, to allow the host device to access the NV memory through the memory controller, wherein the processing circuit is arranged to perform communications specification version control of the memory device in a predetermined communications architecture with aid of compatibility management; and
a transmission interface circuit, arranged to perform communications with the host device;
wherein:
the memory controller receives a first command from the host device through the transmission interface circuit of the memory controller;
the memory controller executes a device-side compatibility management procedure of a compatibility management function to detect whether the host device conforms to any version of multiple predetermined versions of a predetermined communications specification according to the first command to generate a detection result, and selectively switch from one firmware version to another firmware version according to the detection result; and the memory controller sends a first response to the host device through the transmission interface circuit, wherein the first response is sent to the host device in response to the first command;

wherein the first command represents a first predetermined request which is implemented as a read descriptor request, wherein multiple fields of a predetermined format of the read descriptor request comprise:
  a first field, for carrying a first predetermined value;
  a flag field, for carrying at least one flag;
  a task tag field, for carrying at least one task tag;
  a first length field, for carrying a first length; and
  a second length field, for carrying a second length; and
at least one other field reserved for at least one other purpose among the multiple fields is arranged to carry at least one parameter for indicating whether the host device conforms to the any version of the multiple predetermined versions of the predetermined communications specification.

10. The method of claim 2,
wherein the multiple transaction specific fields are at bytes 12-27 of the predetermined format of the read descriptor request.

11. The method of claim 10, wherein the at least one other field is at bytes 18-19 of the predetermined format of the read descriptor request.

* * * * *